(12) United States Patent
Longsdorf et al.

(10) Patent No.: US 7,991,582 B2
(45) Date of Patent: Aug. 2, 2011

(54) PROCESS DEVICE WITH DIAGNOSTIC ANNUNCIATION

(75) Inventors: Randy Longsdorf, Chaska, MN (US); Dale Davis, Prior Lake, MN (US)

(73) Assignee: Rosemount Inc., Eden Prairie, MN (US)

( * ) Notice: Subject to any disclaimer, the term of this patent is extended or adjusted under 35 U.S.C. 154(b) by 1033 days.

(21) Appl. No.: 10/955,790

(22) Filed: Sep. 30, 2004

(65) Prior Publication Data
US 2006/0069455 A1 Mar. 30, 2006

(51) Int. Cl.
*G05B 11/01* (2006.01)
*G06F 17/00* (2006.01)

(52) U.S. Cl. ............. 702/183; 702/64; 702/188; 700/26

(58) Field of Classification Search .................. 702/183, 702/64, 188
See application file for complete search history.

(56) References Cited

U.S. PATENT DOCUMENTS

| | | | |
|---|---|---|---|
| 3,764,983 A | 10/1973 | Stok | 340/150 |
| 3,872,389 A | 3/1975 | Willard | 328/137 |
| 4,206,443 A | 6/1980 | Britton | 340/147 |
| 4,356,475 A | 10/1982 | Neumann et al. | 340/521 |
| 4,484,190 A | 11/1984 | Bedard | 340/825.57 |
| 4,672,529 A | 6/1987 | Kupersmit | 364/130 |
| 4,739,183 A | 4/1988 | Tokura et al. | 307/9 |
| 4,816,825 A | 3/1989 | Chan et al. | 340/825.5 |
| 4,818,994 A | 4/1989 | Orth et al. | 340/870.21 |
| 4,994,788 A | 2/1991 | Philippe et al. | 340/505 |
| 5,008,662 A | 4/1991 | Tokizane et al. | 340/825.06 |
| 5,223,826 A | 6/1993 | Amou et al. | 340/825.06 |
| 5,650,777 A * | 7/1997 | Westfield et al. | 340/870.11 |
| 6,006,338 A * | 12/1999 | Longsdorf et al. | 713/340 |
| 6,176,247 B1 * | 1/2001 | Winchcomb et al. | 137/14 |
| 6,452,493 B1 * | 9/2002 | Ma et al. | 340/533 |
| 6,701,274 B1 * | 3/2004 | Eryurek et al. | 702/140 |
| 7,098,798 B2 * | 8/2006 | Huisenga et al. | 340/635 |
| 7,248,058 B2 * | 7/2007 | Clarridge et al. | 324/601 |
| 2002/0121910 A1 * | 9/2002 | Rome et al. | 324/718 |
| 2004/0024568 A1 * | 2/2004 | Eryurek et al. | 702/182 |
| 2005/0030185 A1 * | 2/2005 | Huisenga et al. | 340/635 |
| 2005/0113942 A1 * | 5/2005 | Longsdorf et al. | 700/79 |
| 2005/0274417 A1 * | 12/2005 | Perry et al. | 137/487.5 |
| 2005/0289276 A1 * | 12/2005 | Karschnia et al. | 710/305 |

FOREIGN PATENT DOCUMENTS

| | | |
|---|---|---|
| EP | 0 490 864 A1 | 12/1991 |
| EP | 0 589 849 A1 | 7/1993 |
| EP | 0 591 926 A2 | 10/1993 |
| JP | 7248801 | 9/1995 |

(Continued)

OTHER PUBLICATIONS

Translation of Chinese Office Action from corresponding Chinese application Serial No. 20058003368.7, dated Jan. 9, 2009.*

(Continued)

*Primary Examiner* — Hal D Wachsman
(74) *Attorney, Agent, or Firm* — Westman, Champlin & Kelly, P.A.

(57) ABSTRACT

A process device for coupling to a two-wire process control loop—includes diagnostic circuitry configured to identify a failure or reduced level of performance or provide a prediction of a future failure or reduced level of performance. An output coupled to the two-wire process control loop is configured to provide an analog output on the loop related to an output from the diagnostic circuitry.

31 Claims, 4 Drawing Sheets

FOREIGN PATENT DOCUMENTS

| | | |
|---|---|---|
| RU | 2134898 | 8/1999 |
| RU | 2159457 | 11/2000 |
| SE | 802931 | 7/1981 |
| WO | WO 98/14854 | 4/1998 |
| WO | WO9814854 * | 4/1998 |

OTHER PUBLICATIONS

"Digital Data Communication, Control and Maintenance", by W. Van Der Bijl, *Journal A, Rosemount*, vol. 34, No. 1, pp. 19-23, 1993.

"Remote Terminal Units for Distributed Control and Data Acquisition", *Acrom Control Systems*, brochure, 1995.

"Field Bus Interface Products for Distributed Control and Data Acquisition", *Acrom Control Systems*, brochure, 1995.

"Communications Gateway Products for Distributed Control and Data Acquisition", *Acrom Control Systems*, brochure, 1995.

"Developing Process Systems Using Hart", *Acrom Control Systems*, pp. 3-22, 1992.

"Notification Concerning Transmittal of International Preliminary Report on Patentability" for International application Serial No. PCT/US2005/033893, filed Sep. 20, 2005.

"Notification of Transmittal of the International Search Report or Declaration" for International application Serial No. PCT/US2005/033893, filed Sep. 20, 2005.

"Written Opinion of the International Searching Authority" for PCT/US2005/033893, filed Sep. 20, 2005.

Chinese Office Action from corresponding Chinese application Serial No. 20058003368.7, dated Jan. 9, 2009, (3 pages translated).

Russian Office Action from corresponding Russian application Serial No. 2007116117/09(017503) filed Sep. 20, 2005, dated Aug. 4, 2009 as stated on the Russian language Office Action; 20 pages.

Chinese Office Action from corresponding Chinese application Serial No. 200580033368.7 issued May 6, 2010 as stated in the Chinese office action; 19 pages.

* cited by examiner

PROCESS DEVICE WITH DIAGNOSTIC ANNUNCIATION

BACKGROUND OF THE INVENTION

The present invention relates to process devices of the type used in industrial processes. More particularly, the present invention relates to communication of diagnostic information.

Field devices such as process controllers, monitors and transmitters, are used in the process control industry to remotely control, monitor or sense a process variable. For example, a process variable may be transmitted to a control room by a transmitter for use in controlling the process or for providing information about process operation to a controller. For example, information related to pressure of process fluid may be transmitted to a control room and used to control the process, such as oil refining.

One typical prior art technique for transmitting information such as a process variable involves controlling the amount of power flowing through a process control loop. Current is supplied from a current source in the control room and the transmitter controls the current from its location in the field. For example, a 4 mA signal can be used to indicate a zero reading and a 20 mA signal can be used to indicate a full scale reading. More recently, transmitters have employed digital circuitry which communicates with the control room using a digital signal which is superimposed onto the analog current signal flowing through the process control loop. One example of such a technique is the HART® communication protocol developed by Rosemount Inc. The HART® protocol and other such protocols typically include a set of commands or instructions which can be sent to the transmitter to elicit a desired response, such as transmitter control or interrogation.

Fieldbus is a communications protocol proposed by the Fieldbus Foundation and is directed to defining a communications layer or protocol for transmitting information on a process control loop. In the Fieldbus protocol, the current flowing through the loop is not used to transmit an analog signal. Instead, all information is digitally transmitted by modulating current flowing in the process control loop. Further, the Fieldbus Standard, and a standard known as Profibus, allow transmitters to be configured in a multi-drop configuration in which more than one transmitter is connected on the same process control loop. Other communication protocols include the MODBUS® protocol and Ethernet. In some configurations, two, three, four or any number of wires can be used to connect to the process device, including non-physical connections such as RF (radio frequency).

Some process transmitters are also capable of transmitting an alarm signal which can provide an indication that the process variable measurement is saturated (i.e. process upset). One type of alarm signal fixes the current through the loop at predetermined levels or outside of predetermined threshold values. For example, one type of alarm signal is a current level which is greater than 21 mA or less than 3.8 mA can be used to send a "high alarm" or a "low alarm", respectively. The alarm signal can be sent by the transmitter upon the occurrence of an alarm condition.

SUMMARY

A process device for coupling to a two-wire process control loop includes diagnostic circuitry configured to diagnose operation of the process device. An output coupled to the two-wire process control loop is configured to provide an output on the loop related to a diagnostic condition. A method and interface circuitry are also provided.

DETAILED DESCRIPTION

The present invention provides a method and apparatus for annunciating diagnostic information through the use of analog signals carried on a two-wire process control loop. Typically, two-wire process control loops employ a 4 to 20 milliamp signal which is used to represent a process variable. However, in many instances process devices are also capable of generating diagnostic information. The invention is related to techniques for communicating such information.

There is an increasing desire that diagnostic capabilities be included in process devices. In particular, there is a desire for such an ability to provide predictive diagnostics which yield an indication of the possibility of a future failure. The knowledge of an impending failure allows maintenance activities to be scheduled and conducted prior to ultimate failure of the device. This results in higher plant availability and increased efficiency.

One obstacle to the implementation of diagnostic capabilities into process devices is the method used to annunciate the diagnostic result. Newer process devices may provide communication techniques by which diagnostic information can be sent to other devices or locations such as to a control room. Examples of such communication techniques include those which utilize Fieldbus, Profibus, Modbus, the Internet, Ethernet, RS-485, wireless communication techniques, and others. These techniques provide an ability for the process device to initiate message transmission and to transmit diagnostic information. However, much of the process control industry continues to utilize older communication techniques such as the HART® communication standard and/or a 4-20 milliamp standard.

Currently, in some configurations, alarm values are used which are outside the normal 4-20 milliamp operating current range to signal an alarm condition. Another technique is to interrogate a device using HART® communication polling techniques. The process device can then digitally communicate the results of diagnostics using the HART® digital communication protocol.

If the 4-20 milliamp loop current is used to transmit an alarm signal, the process variable cannot be simultaneously sent because the analog output function is changed from indicating a process variable to indicating the diagnostic information. Further, such a technique is not particularly well-suited for predictive diagnostics because the alarm signal is only sent after the alarm condition has occurred. Further still, the alarm cannot be sent in a continuous manner without loss of the process variable. Although a message can be communicated from a process device in accordance with the HART® communication standard, this method is limited to installations where HART® hosts are present and are configured to receive diagnostic information. Further, in installations where HART® hosts are present, the additional traffic associated with diagnostic related polling may adversely affect system bandwidth.

The present invention provides a method and apparatus for sending diagnostic information from a process device in the form of an analog current transmitted over a two-wire process control loop. The analog output can be in any number of forms. In one example, a current level is set or controlled on a process control loop which is indicative of diagnostic conditions and the current level has more than two values. A particular current level can be mapped to particular diagnostic condition to provide the diagnostic information. Similarly, an additional process device can be coupled to the process device which provides the diagnostic. This additional process device can receive a digital representation of a diagnostic condition and can convert the digital representation into an analog 4-20 milliAmp current signal. This 4-20 milliAmp current signal can be used with existing control room devices. Such a device which is capable of converting a digital process variable into an analog 4-20 milliAmp signal is shown and described in U.S. Pat. No. 5,650,777, issued Jul. 22, 1997, entitled CONVERSION CIRCUIT FOR PROCESS CONTROL SYSTEM.

When used to provide for predictive diagnostics, the current level in the loop can be controlled to indicate changes in the diagnostic result. For example, a gradually degrading component or other diagnostic indication can be indicated by a gradually increasing (or decreasing) analog value along a predetermined profile. When the analog value exceeds a predetermined threshold, equipment in a control room can be used to provide an indication that a fault may be impending. Similarly, a host system which monitors the diagnostic analog current output can be configured to execute an exception handling strategy based upon a user defined threshold. If the analog value exceeds the threshold, a particular control configuration can be implemented. This can be used to safely shut down operation of the process. In another example, the process device provides a second analog output in addition to the analog process variable output. An analog output can also be produced by a remote input/output device such as a device concentrator or similar device. In another example, rather than providing a single discreet current level to represent a diagnostic condition, the process device can provide a particular pattern of current levels to represent a particular process condition This configuration allows existing control room equipment to utilize diagnostic capabilities in process devices. Existing control room equipment can be easily programmed to monitor analog current levels and take a desired step, such as signaling an alarm if a threshold is exceeded. The invention can be configured to allow simultaneous access to the measured process variable as well as the diagnostic result. Further, an analog output which can take on multiple values can be used to provide an indication across a continuum of diagnostic results, such as diagnostic results representative of a health of a device or component. This provides much more information to the control room than simply providing a discreet alarm value. Further, this configuration does not require additional polling of devices or other complex infrastructure.

Figure 1:
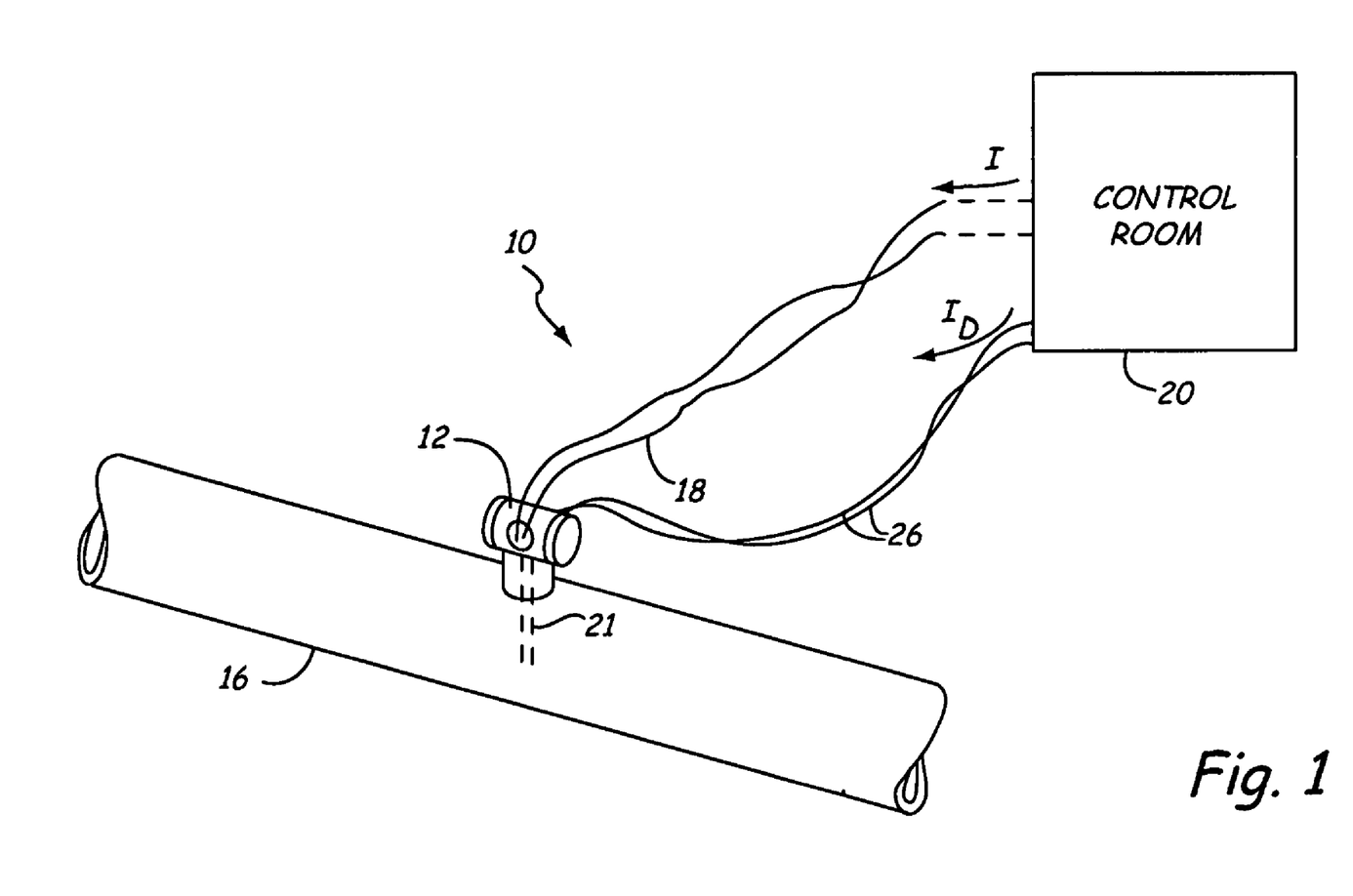
FIG. 1 is a diagram which illustrates a process control system including a process device which couples to a process control loop.

FIG. 1 is a diagram of process control system 10 which includes a transmitter 12 connected to process pipe 16. Transmitter 12 is coupled to a two-wire process control loop 18 which operates in accordance with a desired protocol such as the HART® standard or a 4-20 milliAmp analog standard. However, the invention is not limited to these standards or a two-wire configuration. Two-wire process control loop 18 runs between transmitter 12 and the control room 20. In an embodiment in which loop 18 operates in accordance with the HART® protocol, loop 18 can carry a current I which is representative of a sensed process variable. For example, a sensor 21 can sense the process variable for transmission on loop 18. Additionally, the HART® protocol allows a digital signal to be superimposed on the current through loop 18 such that digital information can be sent to or received from transmitter 12. In one embodiment, instead of representing a process variable, the current I carried in loop 18 is representative of a diagnostic condition. For example, the current I can be between 4 milliAmps and 20 milliAmps and representative of a particular diagnostic condition determined by circuitry in process device 12. In another example, the current I can be set to any number of values, including any value in a continuous range of values, which are representative of a diagnostic determination. For example, a 4 milliAmp current can represent a particular diagnostic condition whereas a 5 milliAmp can represent another diagnostic condition, etc. If a continuous value is used, the current I can range between two endpoints and its value be representative of a continuously variable diagnostic condition. In another example, the current I can be set to three or more different current levels representative of diagnostic conditions. Circuitry in the control room 20 can monitor the current level I carried in loop 18. For example, conventional control room components are capable of monitoring current levels and issuing alarms or providing other outputs if the current level I exceeds or reaches a particular threshold.

FIG. 1 also illustrates an optional second process control loop 26. In an embodiment which employs process control loop 26, process control loop 18 can transmit a standard process variable, for example one measured using process variable sensor 21. The second process control loop 26 can carry a current $I_D$ representative of diagnostic information in a manner similar to that discussed above. However, other transmission techniques can also be used. Such a configuration allows the process control loop 18 to be continuously available for transmission of the primary process variable while the diagnostic information is provided on a second process control loop 26. In one configuration, the second process control loop 26 carries digital information related to the diagnostic condition.

Figure 2:
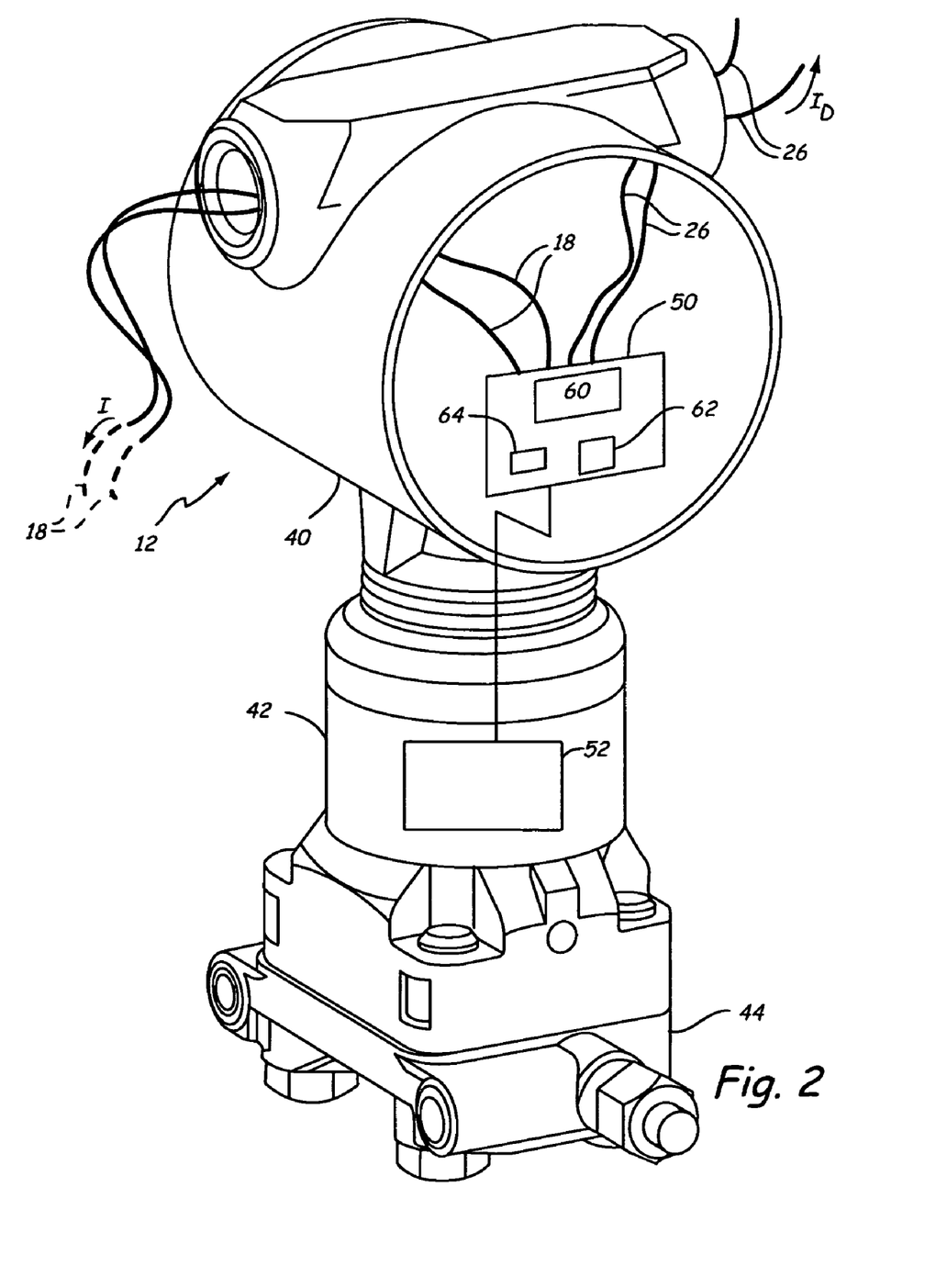
FIG. 2 is a perspective view which illustrates within the process device of FIG. 1.

FIG. 2 is a perspective view of transmitter 12 which shows one example configuration of circuitry blocks carried therein. In this example embodiment, transmitter 12 includes a feature module 40 which couples to a sensing module 42. The sensing module 42 couples to process piping 16 (shown in FIG. 1) through manifold process coupling 44.

Feature module 40 includes feature module electronic circuitry 50 which couples to sensing module electronic circuitry 52 carried in sensing module 42. Typically, the sensing module electronic circuitry 52 couples to a process variable sensor, for example sensor 21 shown in FIG. 1, which is used to sense a process variable related to operation of the process. Feature module electronic circuitry 50 includes output circuitry 60, process variable circuitry 62, and diagnostic circuitry 64. The circuitry 60, 62 and 64 can be implemented in hardware, software or a hybrid combination of the two and can be located anywhere within transmitter 12. Further, the various circuits 60, 62 and 64 can share components.

During operation, output circuitry 60 controls the value of the current I flowing through loop 18 to represent, for example, a measured process variable or a diagnostic condition. This can be used to monitor or control operation of an industrial process. In some applications, output circuitry 60 is also used to provide power to circuitry within transmitter 12 which is generated using power received over loop 18 and/or loop 26. If secondary loop 26 is used, output circuitry 60 is also configured to control the current level. Output circuitry 60 can consist of a single output circuit or multiple output circuits.

According to one aspect of the present invention, diagnostic circuitry 64 performs any type of diagnostics which are used to detect or predict failure modes of transmitter 12 and/or other process devices or components. The diagnostic circuitry 64 activates output circuitry 60 which places a diagnostic current level on loop 18 or 26. For example, the output circuitry 60 can set the loop current to a predetermined value. In a 4-20 mA current loop, in one example, the current I can be set to a value less than 3.8 mA or greater than 21 mA by output circuitry 60 to thereby send an alarm signal on loop 18 or 26. These current levels are referred to as "low alarm" and "high alarm", respectively. However, the current level can be set to any level as desired. For example, as discussed above, the current can be set to more than three different levels, each of which indicates a diagnostic condition. In another example, the current level can be set to a value between 4 milliAmps and 20 milliAmps to represent the diagnostic condition. A continuous value of the current level can also be used to provide an output indicative of a continuous diagnostic condition. Further, the current level can be changed over time in a predetermined pattern to indicate a particular diagnostic condition.

Figure 3:
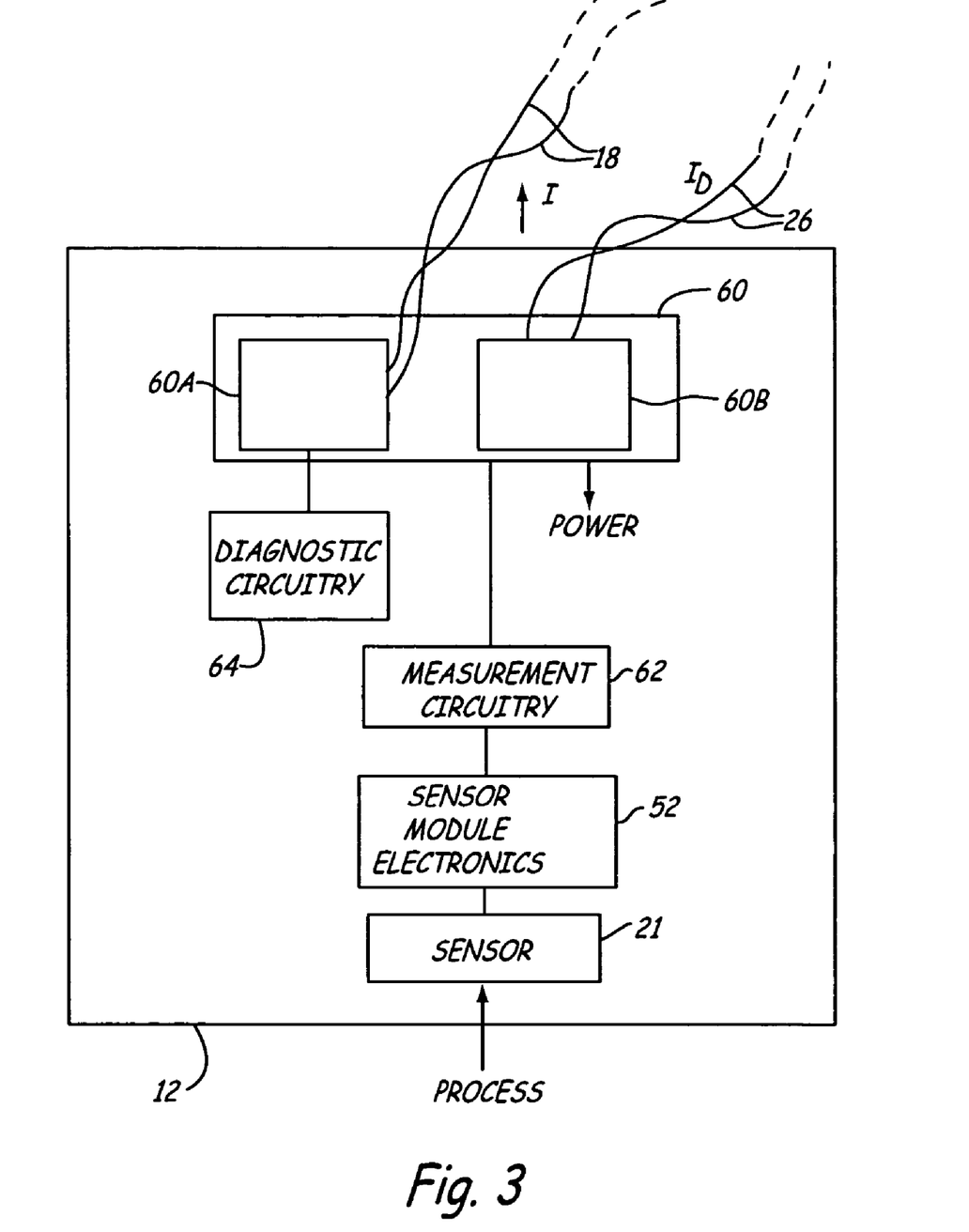
FIG. 3 is a simplified block diagram of circuitry in the process device.

FIG. 3 is a simplified block diagram of transmitter 12. As shown in FIG. 3, transmitter 12 includes measurement circuitry 62 which couples to process variable sensor 21. Measurement circuitry 62 can be included on sensor module circuitry electronics 52 shown in FIG. 2. Circuit 60 connects to measurement circuitry 62 and is configured for sending (and, in some embodiments, receiving) information on process control loop 18 and optional loop 26. The output circuit 60 includes first loop output circuit 60A and optional second loop output circuit 60B. However, circuitry 60A and 60B can be configured in accordance with other embodiments. The measurement circuitry 62 is configured to provide initial processing of process variables sensed by sensor 21. The implementation of measurement circuitry 62 frequently includes a microprocessor. The microprocessor may also be used to implement other circuit functionality shown in the device.

During normal operation, the process variable sensed by sensor 21 is converted into an analog current level or a digital signal for transmission on process control loop 18 using output circuitry 60. However, when a diagnostic condition is sensed by diagnostic circuitry 64, output circuitry 60 is configured to provide a current level output on loop 18 or 26 at a predetermined current level, for example, above or below a predetermined threshold level. The output circuitry 60A, 60B can be connected in series or parallel with other circuitry. Other configurations can also be used. In some embodiments, the second output circuit 60B is configured to switch off or otherwise disconnect or power down during periods of non-use, inactivity or power reduction.

Figure 4:
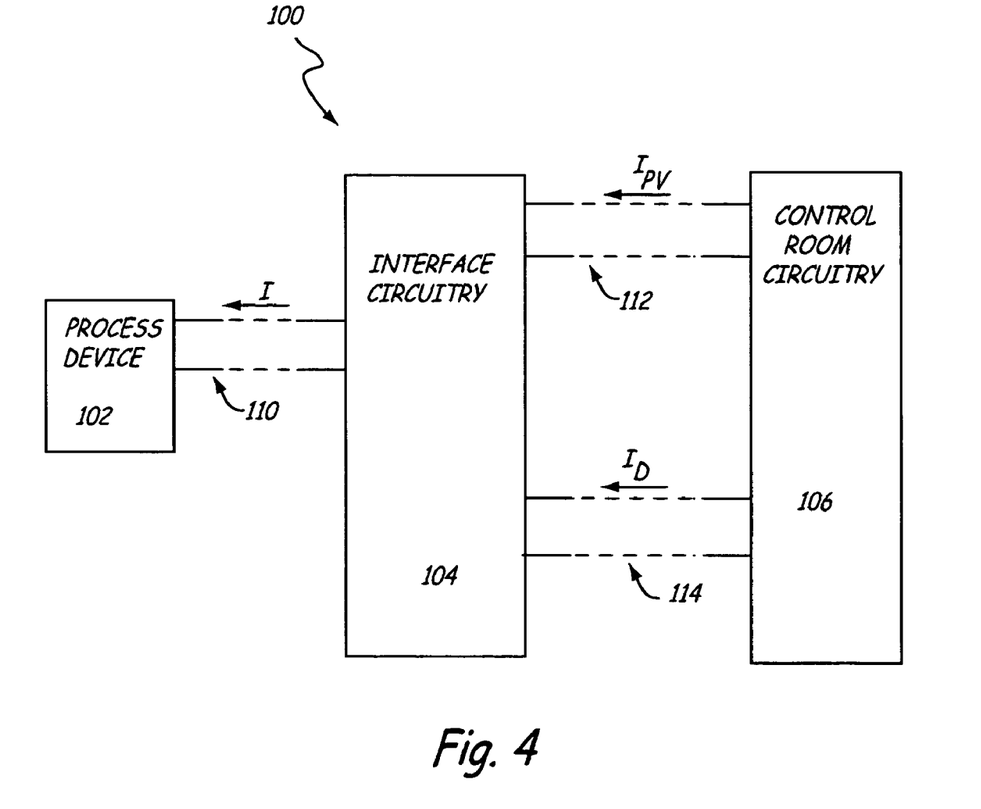
FIG. 4 is a simplified block diagram illustrating interface circuitry for coupling a process device to control room circuitry.

FIG. 4 is a simplified block diagram of a process control system 100 including a process device 102, interface circuitry 104 and control room circuitry 106. Process device 102 is shown as being coupled to a single process control loop 110. This process control loop is configured to carry more than one type of information. For example, a primary process variable can be represented by a current I carried on the loop 110 and other information can be digitally modulated onto the loop 110. In another example, all information is digitally modulated onto the control loop 110.

Control loop 110 couples to interface circuitry 104 which couples to control room circuitry 106 through first process control loop 112 and second process loop 114. The interface circuitry 104 receives information of more than one type from process device 102 over loop 110. At least one type of information received by interface circuitry 104 relates to diagnostics. The interface circuitry 104 is configured to provide a current level $I_D$ on loop 114 which is related to the received diagnostic information. The current level is received by the control room circuitry 106 such that the control room circuitry 106 receives diagnostic information. Interface circuitry 104 can couple to other process control loops such as loop 112 which is illustrated as carrying an $I_{PV}$. For example, the current level in loop 112 can be representative of a process variable received from process device 102. In some configurations, the interface circuitry 104 only provides diagnostic information to control room circuitry 106. In such a configuration, process variable information can be provided, for example, over an independent loop such as loop 110.

Although a single process device 102 is shown coupled to loop 110, and a single loop 110 is shown coupled as an input to interface circuitry 104, any number of process devices and/or process control loops can couple to interface circuitry 104. Similarly, interface circuitry 104 can control the current or digital signals carried in any number of process control loops. Further, the diagnostics can be performed by circuitry associated with interface circuitry 104, for example using input data received from the loop.

Using the configuration shown in FIG. 4, the control room circuitry 106 can operate in accordance with conventional techniques. For example, the control room circuitry 106 can simply monitor the current level $I_D$ carried in loop 114 and trigger an alarm or other output if the current level passes a predetermined threshold. The interface circuitry 104 allows access by control circuitry 106 to information from a process device in a conventional format as opposed to requiring the circuitry 106 to be updated in accordance with newer standards. The interface circuitry can map the diagnostic information to particular current levels based upon a particular diagnostic condition. The interface circuitry can provide a current level as a continuous or semi-continuous value or can provide a pattern in a current level output to indicate a diagnostic condition. The interface circuitry can be physically located in any appropriate location in the system 100, for example within a control room, outside a control room but in a non-hazardous area, or in a hazardous area in which the circuitry must meet intrinsic safety standards. The loop interface circuitry 104 can be powered completely from one or more process control loops coupled to the circuitry 104. However, in such a configuration, the interface circuitry may require sufficient power to power the process control loop 110 and, in some configurations, process device 102. Alternatively, a separate power source can be used to power interface circuitry 104.

As used herein, any process device can generate diagnostic information including controllers, positioners, process variable measurement devices, interface circuits or other devices which couple to a process control loop. The diagnostic information can be generated locally and/or generated based upon data received from other sources, for example over a process control loop. The diagnostic information can be any type of diagnostic information including diagnostic information related to the occurrence of an immediate event, or predictive information related to the possibility of an occurrence of a future event. Any desired diagnostic technique can be used with the present invention.

Although the present invention has been described with reference to preferred embodiments, workers skilled in the art will recognize that changes may be made in form and detail without departing from the spirit and scope of the invention. The above description illustrates the invention in one example configuration and any appropriate process control loop may be used such as 4-20 mA, 2, 3, or 4 wire loop, multi-drop loop and a loop operating in accordance with Fieldbus, Profibus, HART® or other communication protocol which transmits process-related information by controlling current flow in a process control loop. The present invention can be particularly useful in a Safety Instrumented System (SIS) configuration which provides an additional safety layer to a process control loop. The invention can provide a technique of improving the Safety Integrity Level (SIL) rating of a process device by providing additional diagnostic annunciation capability. In one example, alarm levels are annunciations of diagnostic conditions.

What is claimed is:

1. A process device for coupling to a two-wire process control loop comprising:
    diagnostic circuitry configured to diagnose operation of the process device or the process;
    an output responsive to the diagnostic circuitry configured to couple to the two-wire process control loop configured to provide an analog current output on the loop, wherein the analog current level has a first value indicative of a first diagnostic condition, a second value indicative of a second diagnostic condition, and a third value indicative of a third diagnostic condition, wherein the first, second and third values are indicative of diagnostic conditions and not a process variable.

2. The process device of claim 1 wherein the loop analog current output is between 4 mA and 20 mA.

3. The process device of claim 1 wherein the loop analog current output is indicative of predictive diagnostic information.

4. The process device of claim 1 wherein the process device comprises a process variable transmitter.

5. The process device of claim 1 wherein the process device comprises a process controller.

6. The process device of claim 1 wherein the process device is configured for use in a Safety Instrumented System.

7. The process device of claim 1 wherein the process device is completely powered with power received through the process control loop.

8. The process device of claim 1 wherein the process control loop operates in accordance with the HART® protocol.

9. The process device of claim 1 wherein the diagnostic conditions are related to standardized diagnostic conditions which are mapped to particular current levels.

10. The process device of claim 1 including a second process control loop including a second output configured to couple to a second two-wire process control loop, the second output related to a sensed process variable.

11. The process device of claim 10 wherein circuitry of the process device is completely powered with power received through the second process control loop.

12. The process device of claim 10 wherein circuitry associated with at least one of the analog current output and the second output is configured to power off during periods of inactivity.

13. The process device of claim 1 wherein the diagnostic circuitry is implemented in a feature module which is coupled to a sensor module of the process device.

14. The process device of claim 1 wherein the analog current output is changed between values over time in a pre-determined pattern indicative of a diagnostic condition.

15. The process device of claim 1 wherein the analog current output comprises a semi-continuous current level.

16. A process device for coupling to a two-wire process control loop comprising:
    diagnostic circuitry configured to diagnose operation of the process device or process;
    an output configured to couple to the two-wire process control loop configured to provide an analog current output on the loop in response to diagnosed operation of the process device or process, wherein the analog current level has a first value indicative of a first diagnostic condition, a second value indicative of a second diagnostic condition, and a third value indicative of a third diagnostic condition and having a value of between 4 milliAmps and 20 milliAmps, wherein the first, second and third values are indicative of diagnostic conditions and not a process variable.

17. The process device of claim 16 wherein the loop analog current output is indicative of more than two diagnostic conditions.

18. The process device of claim 16 wherein the loop analog current output is indicative of predictive diagnostic information.

19. The process device of claim 16 wherein the process device comprises a process variable transmitter.

20. The process device of claim 16 wherein the process device comprises a process controller.

21. The process device of claim 16 wherein the process device is configured for use in a Safety Instrumented System.

22. The process device of claim 16 wherein the process device is completely powered with power received through the process control loop.

23. The process device of claim 16 wherein the process control loop operates in accordance with the HART® protocol.

24. The process device of claim 16 wherein the diagnostic conditions are related to standard diagnostic conditions which are mapped to particular current levels.

25. The process device of claim 16 including a second process control loop including a second output configured to couple to a second two-wire process control loop, the second output related to a sensed process variable.

26. The process device of claim 25 wherein circuitry of the process device is completely powered with power received through the second process control loop.

27. The process device of claim 25 wherein circuitry associated with at least one of the analog current output and the second output is configured to power off during periods of inactivity.

28. The process device of claim 16 wherein the diagnostic circuitry is implemented in a feature module which is coupled to a sensor module of the process device.

29. The process device of claim 16 wherein the analog current output is changed between values over time in a pre-determined pattern indicative of a diagnostic condition.

30. The process device of claim 16 wherein the analog current output comprises a semi-continuous current level.

31. A method of annunciating diagnostic information related to a process device or a process coupled to a two-wire process control loop comprising:
   diagnosing operation of the process device or the process;
   outputting an analog current level on the two-wire process control loop in response to diagnosed operation of the process device or process, wherein the analog current level has a first value indicative of a first diagnostic condition, a second value indicative of a second diagnostic condition, and a third value indicative of a third diagnostic condition, wherein the first, second and third values are indicative of diagnostic conditions and not a process variable.

* * * * *